United States Patent [19]
Fernandez

[11] Patent Number: 5,974,656
[45] Date of Patent: Nov. 2, 1999

[54] PROCESS FOR MOUNTING A SHAFT TO THE ROTOR OF AN ELECTRIC MOTOR

[75] Inventor: JoséLuiz Palomar Fernandez, Joinville-SC, Brazil

[73] Assignee: Empresa Brasileira de Compressores S/A Embraco, Joinville-SC, Brazil

[21] Appl. No.: 09/068,482
[22] PCT Filed: Sep. 26, 1997
[86] PCT No.: PCT/BR97/00051
 § 371 Date: May 28, 1998
 § 102(e) Date: May 28, 1998
[87] PCT Pub. No.: WO98/16000
 PCT Pub. Date: Apr. 16, 1998

[30] Foreign Application Priority Data

Oct. 7, 1996 [BR] Brazil .................................... 9604356

[51] Int. Cl.⁶ .................................................. H02K 15/00
[52] U.S. Cl. ................................. 29/596; 29/598; 29/732
[58] Field of Search ............................. 29/596, 598, 732

[56] References Cited

U.S. PATENT DOCUMENTS 4,221,488  9/1980  Nunlist et al. .

FOREIGN PATENT DOCUMENTS 01109029  4/1989  Japan ............................... B23P 11/00
05022881  1/1993  Japan ............................... H02K 1/27

Primary Examiner—Lee Young
Assistant Examiner—Davide Caputo
Attorney, Agent, or Firm—Darby & Darby

[57] ABSTRACT

A process for mounting the shaft to the rotor of an electric motor, comprising the steps of: positioning a cylinder block (3) and a rotor (7) relative to each other with a predetermined axial spacing therebetween and with the axes of a bearing bore of the cylinder block (3) and of a central bore of rotor (7) being aligned to each other inside a hermetic chamber (10) having an atmosphere inert at pressures higher than the atmospheric pressure; introducing a shaft (5) which has been diametrically contracted by refrigeration in the hermetic chamber (10) through both the bearing bore and the central bore of the rotor (7); maintaining the shaft (5)-cylinder block (3)-rotor (7) assembly inside the hermetic chamber (10) immobilized until the diametrical thermal dilatation of the shaft (5) causes said shaft to be secured to the wall of the central bore of rotor (7) and until a thermal balance between the parts has been achieved.

9 Claims, 2 Drawing Sheets

PROCESS FOR MOUNTING A SHAFT TO THE ROTOR OF AN ELECTRIC MOTOR

FIELD OF THE INVENTION

The present invention refers to a process and a device for mounting a shaft to a rotor-cylinder block assembly in hermetic compressors for refrigeration systems.

BACKGROUND OF THE INVENTION

Reciprocating hermetic compressors comprise a cylinder block, which is mounted inside a hermetically closed shell and which is secured to said shell through an adequate dampening means, said cylinder block having a main bearing, which receives and supports a flange portion of a rotor shaft which is concentrically placed in a central bore provided in the main bearing of the cylinder block. A lower end portion of the rotor shaft, projecting from the main bearing, is rigidly mounted to the rotor of the electric motor of the compressor. In reciprocating compressors, said shaft moves parts of a connecting rod—piston subassembly during its rotation caused by the rotation of the rotor, said shaft providing at the same time the pumping of the lubricant oil to the movable parts of the compressor.

The mounting of the shaft to the rotor is achieved in order to avoid the formation of gaps between said parts, avoiding relative movements between the shaft and the rotor.

One of the known processes for mounting the electric motor shaft of the above cited type uses mechanical interference at room temperature or with rotor heating. In the mounting in which there is little or no rotor heating, the shaft is introduced with a great effort into the central bore of the rotor, causing mechanical wear of said shaft and rotor parts, which usually deforms the resilient components or fragile component parts of the assembly.

In the mounting under high temperature, the shaft is introduced into the rotor when said rotor is heated to a temperature enough to cause its dilatation and consequent diameter increase of the central bore. The fixation of the shaft to the rotor, after said shaft has been introduced in said rotor, occurs during cooling and consequent contraction of said rotor, which, by reducing the diameter of the bore, eliminates the mounting gap and adjusts the rotor to the shaft. This type of assembly damages the components which are delicate or susceptible to deterioration caused by heat in the rotor.

In order that the assembly with rotor heating does not require great efforts, it is necessary to increase the temperature of the rotor. Nevertheless, in ECM motors, in which the rotor carries magnets, such temperatures cause damages to the rotor, since it is still required a determined degree of mechanical interference, or because the high temperature, which is necessary to eliminate the mechanical interference, destroys the rotor magnets.

This effect is particularly important when the magnets are affixed around the rotor core.

These problems are intensified when part of the components involved are obtained, e.g. by sintering, such as the rotors formed with sinterized magnets, which besides being fragile do not resist to high temperatures or high thermal gradients, the characteristics of said rotors being impaired when the temperature is higher than 120° C.

Moreover, high temperatures are also infeasible in solutions in which a rotor cover of the stainless steel type or a coiled cover is used. Although the stainless steel covers support high temperatures, in this solution the heating destroys the resin which retains the magnets on the rotor core. The coiled cover cannot withstand temperatures above 150° C.

Another inconvenience of the known solutions comes from the need for high and costly dimensional precision of the shaft-rotor parts, in order to guarantee an acceptable degree of mechanical interference during the assembly, maintaining the heating temperature of the rotor within acceptable limits.

DISCLOSURE OF THE INVENTION

Thus, it is an object of the present invention to provide a process and a device for mounting the shaft to the rotor of an electric motor, which does not submit the fragile or heat susceptible components to harmful high temperatures or efforts, minimizing losses and leading to an economical and industrially feasible result.

Another object of the present invention is to provide a mounting process and device as cited above, which results in a shaft-rotor-cylinder block assembly for a hermetic compressor, without having impurities and/or contaminations, such as the presence of water.

These and other objectives are achieved by a process and a device for mounting the shaft to the rotor of an electric motor, said shaft having at its upper part an annular flange portion, which is seatable on a bearing portion of a cylinder block, the rotor being attachable around the shaft, said process comprising the steps of:

a—taking a cylinder block and a rotor from a secondary feeding station to a mounting station provided inside a hermetic chamber having an atmosphere inert to pressures higher than the atmospheric pressure, positioning the cylinder block and the rotor relative to each other with a predetermined axial spacing therebetween and with the axes of a bearing bore of the cylinder block and of a central bore of the rotor being aligned to each other;

b—taking a shaft, which has been diametrically contracted by refrigeration in a primary feeding station inside the hermetic chamber, to the mounting station and introducing the shaft through both the bearing bore of the cylinder block and the rotor central bore, until a mounting position has been achieved in said rotor, without interfering with the walls of said bores;

c—maintaining the shaft-cylinder block-rotor assembly immobilized in the mounting station, until the diametrical thermal dilatation of the shaft causes said shaft to be secured to the wall of the rotor central bore; and d—displacing the mounted shaft-cylinder block-rotor assembly from the mounting station and maintaining said assembly inside the hermetic chamber, until a thermal balance between the parts has been achieved, step "b" occuring within a time interval insufficient for the contracted diameter of the shaft to achieve, by dilatation, a value which is higher than a maximum mounting diameter which is lower than the diameter of the rotor central bore.

The present device comprises, besides the parts cited above, a carrying means, which takes from the primary feeding station each shaft which has been diametrically contracted by refrigeration and introduces said shaft through a bearing bore of the cylinder block, into the central bore of the rotor, said bores being previously positioned in the mounting station, until a mounting position for said rotor has been reached, without interfering with the walls of said bores.

BRIEF DESCRIPTION OF THE DRAWINGS

The invention will be described below, with reference to the attached drawings, in which.

BEST MODE OF CARRYING OUT THE INVENTION

Figure 1:
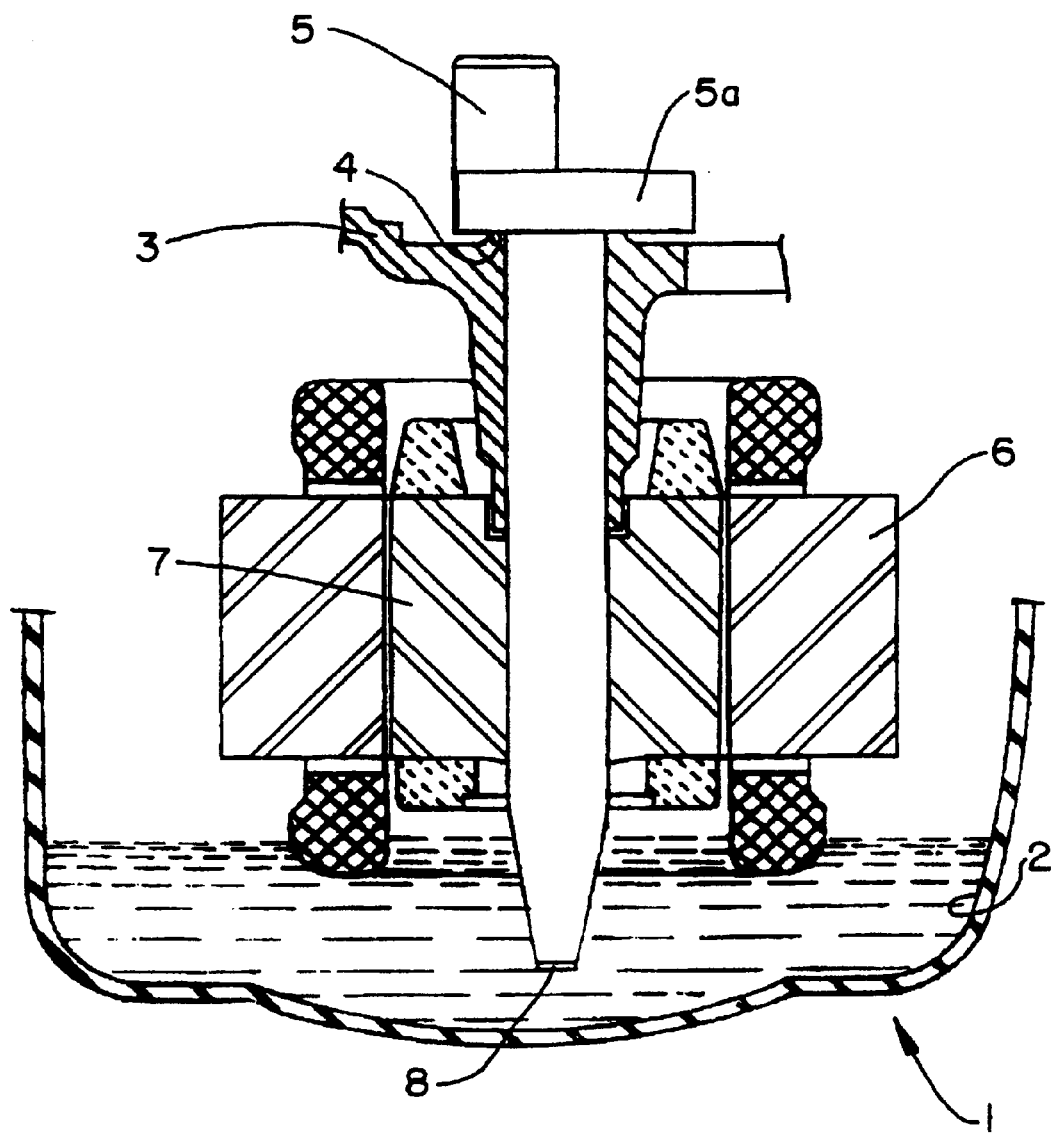
FIG. 1 shows schematically and in a cross sectional view a shaft, which is mounted to the rotor of an electric motor of the type used in small refrigeration compressors.
Figure 2:
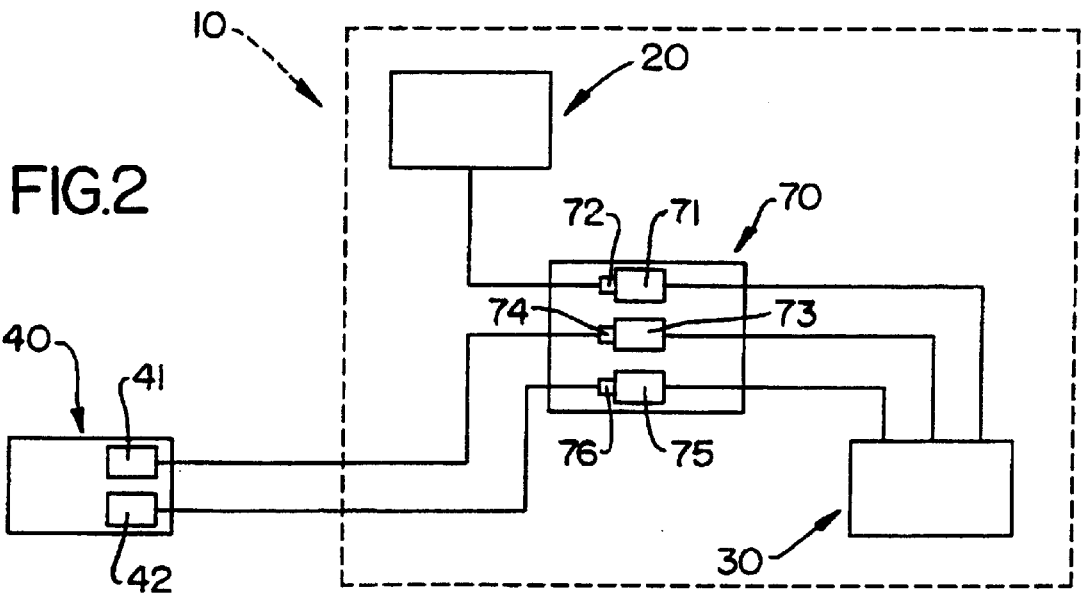
FIG. 2 shows, in a block diagram, the mounting operation of a rotor shaft, according to the present invention.
Figure 3:
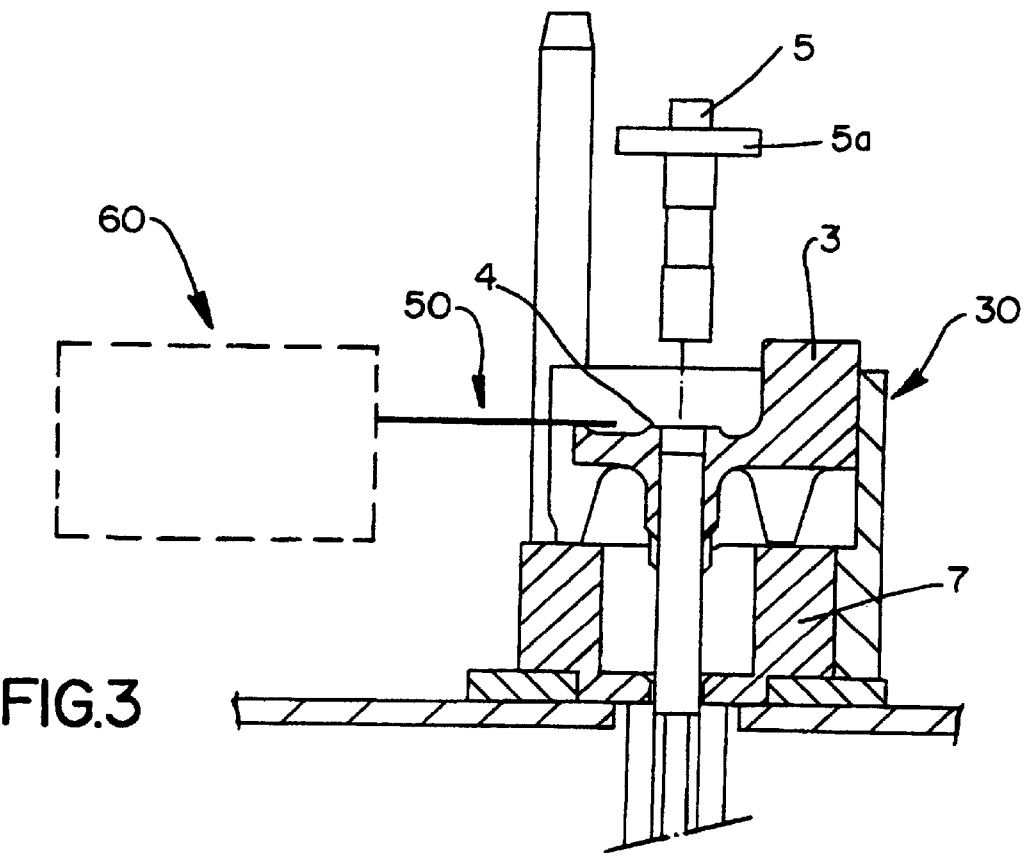
FIG. 3 shows, schematically, part of the device for mounting the rotor shaft of an electric motor of the present invention.

According to the figures, a hermetic compressor with a vertical shaft comprises a hermetic shell 1, which defines a lubricating oil reservoir 2 on its bottom and which lodges therein a cylinder block 3 defining at its upper portion an axial bearing 4 for supporting a vertical shaft 5, whereupon is seated a flange portion 5a of the latter, and an electric motor having a stator 6 secured to the cylinder block 3 and a rotor 7 affixed to a portion of said shaft 5 which is located below the axial bearing 4 and which defines a shaft-rotor assembly, said shaft 5 fitting at its lower end a centrifuge pump 8, with its lower end being immersed in the oil mass provided in said reservoir 2.

The mounting of shaft 5 to the rotor 7 is achieved in a rigid manner without gaps, in order to avoid relative movements between said parts during the operation of the electric motor.

According to the present invention, the assembly of each shaft 5 to the rotor 7 occurs with a device comprising a hermetic chamber 10, having an inert atmosphere at a determined internal temperature Ti, which is lower than a temperature external to the environment of the hermetic chamber 10 and with an internal pressure Pi, which is higher than the atmospheric pressure and which is external to the environment of said hermetic chamber 10. As described below, this higher internal pressure prevents the pieces that are going to be mounted and secured to each other from accumulating impurities, such as water on the surfaces thereof.

The present device further comprises a primary feeding station 20, in which is maintained a plurality of shafts which are going to be sequentially and individually taken to a mounting station 30, where each shaft 5 is introduced into an assembly formed by said cylinder block 3 and rotor 7, which have been previously positioned relative to each other in a precise manner in this mounting station 30, in order to receive and secure a shaft 5. The primary feeding station 20 and the mounting station 30 are placed inside the hermetic chamber 10.

In a solution of the present invention, the primary feeding station 20 is in the form of a cryogenic chamber containing liquefied inert gas under low temperature, particulary liquid nitrogen at a temperature of about −200° C., for example −196° C., said chamber being dimensioned to receive and maintain therewithin a plurality of shafts to be refrigerated so as to be individually mounted to each respective cylinder block 3-rotor 7 assembly during a time interval sufficient for each shaft 5 to reach a determined degree of diametrical contraction, which is previously established and sufficient for said shaft to be posteriorly mounted to a cylinder block 3-rotor 7 assembly positioned at the mounting station 30, with no contact interference between the external surface of said shaft 5 and the walls of a bearing bore of the cylinder block 3 and of a central bore of the rotor 7.

Supplying said plurality of shafts to the primary feeding station 20 is carried out by an appropriate feeding means, not illustrated, for instance an external chute, which automatically allows the selective admission of each shaft 5 inserted therein to the inside of the hermetic chamber 10 and consequently to the primary feeding station 20, when a shaft 5, diametrically contracted by refrigeration inside said chamber, is conducted to the mounting station 30 and introduced through the bearing bore of the cylinder block 3 into the central bore of the rotor 7, until reaching a mounting position in said rotor, without interfering with the walls of said bores, as mentioned above.

In order to avoid the contamination of the mounted shaft 5-cylinder block 3-rotor 7 parts, said parts are maintained inside the hermetic chamber 10, until a thermal balance is achieved between said parts, which does not permit said contamination to occur anymore when the mounted assembly is submitted to temperature and pressure conditions outside said hermetic chamber 10.

The temperature and pressure conditions existing inside the hermetic chamber 10 are maintained by thermal exchange between the liquified gas which is evaporated from the primary feeding station 20 and also between each refrigerated shaft 5 in said chamber and the inside of the hermetic chamber 10.

The primary feeding station 20 comprises a container, which is open at its top at least on part of its extension and which is provided with a plurality of supply ducts of cryogenic fluid, which continuously supply the inside of the hermetic chamber 10 with the liquified gas under low temperature, in order to maintain the temperature of the container at the level needed to carry out the process.

The supply of the rotor 7 and cylinder block 3 parts occurs from at least one secondary feeding station 40, which is placed external to the hermetic chamber 10 and where is found at least one rotor 7 and one cylinder block 3 to be conducted to the mounting station 30, before the removal of a respective shaft 5 from the primary feeding station 20. In a variant of this construction, the second feeding station 40 presets each cylinder block 3 and rotor 7 relatively to each other, before they are conducted to the mounting station 30. In another constructive option, each cylinder block 3 and each rotor 7 are individually conducted in a sequential or simultaneous way to the mounting station 30, where they are positioned relatively to each other in order to receive a shaft 5. According to the present invention, the secondary feeding station 40 comprises a rotor feeding station 41 and a cylinder block feeding station 42, the former containing rotors and the latter containing cylinder blocks to be taken to the hermetic chamber 10, when each shaft 5 is to be mounted to a rotor 7-cylinder block 3 assembly.

In the relative positioning between each rotor 7 and each cylinder block 3, the latter is placed on top of the rotor 7, in a precise way and at an axial distance thereof which is previously determined in function of the axial gap which is necessary for the normal operation of said parts in a hermetic compressor. The accurate assembly is also required in relation to the relative alignment between the axis of the rotor 7 and a bearing bore of the cylinder block 3, said alignment determining the mounting alignment of the shaft 5 and said cylinder block 3 and rotor 7 parts.

For the motor operation, between the cylinder block 3 and the rotor 7 there should exist a determined axial gap which is necessary to allow the rotor to rotate freely in relation to the fixed parts of the motor.

In a solution of the present invention, in order to obtain this axial gap between the cylinder block 3 and rotor 7, during the assembly of the shaft 5 to said cylinder block and rotor parts and after the alignment of the axes of the bearing bore of the cylinder block 3 and of the rotor bore, a spacing blade 50 usually in the form of a fork is seated on the axial bearing 4 of the cylinder block 3, which is already directly seated on the rotor 7. Shaft 5 is then taken to the mounting position, in which its flange portion 5a is seated on the spacing blade 50. The spacing blade 50 is removed when the assembly of the above cited parts has finalized.

In this construction, the spacing blade 50 is displaced between an inoperative position, in which it is retracted in relation to the cylinder block-rotor assembly, and an operative position, in which it is seated on the axial bearing in said cylinder block 3 for receiving and seating, on its upper face, the annular flange 5a of shaft 5. The thickness of said spacing blade 50 is defined so as to guarantee the desired cylinder block-rotor gap. Said spacing blade 50 is automatically spaced back to its inoperative position after a sufficient time interval has elapsed to allow the fixation between shaft 5 and rotor 7, upon a dilatation of said shaft 5 sufficient to avoid relative movements between said shaft and said rotor. The movement of the spacing blade 50 between its operative and inoperative positions occurs by the actuation of an adequate impelling means 60.

In another possible but more complex construction, the operating axial gap of the motor between rotor 7 and cylinder block 3 is obtained with a relative positioning between said parts, which is already calculated considering the existence of said axial gap for the motor operation in the mounting station 30.

The displacement of each shaft 5 from the primary feeding station 20 to the mounting station 30 occurs through a carrying means 70.

For mounting a shaft 5 to a cylinder block-rotor assembly, said shaft is required to have a diametrical contraction which will reduce its diameter to a value lower than that of the central bore of rotor 7 and which is calculated considering the dilatation to which said shaft 5 is submitted by thermal exchange with the inside of the hermetic chamber 10 during its transportation from the primary feeding station 20 to the mounting station 30.

When each shaft 5 is removed from the primary feeding station 20, the liquified gas still existing on the surface of the shaft 5 will act as an insulating layer around said shaft and, even evaporating into the internal environment of the hermetic chamber 10, exchanging heat therewith, produces a thermal inertia which retards the thermal dilatation of said shaft 5. The movement of shaft 5 from the primary feeding station 20 to its mounting position inside the bearing bore of cylinder block 3 and the central bore of rotor 7 should occur in a time interval calculated in function of the maximum possible thermal dilatation for each shaft 5 to be securely mounted inside the rotor in a time lower than 1 second, for example.

In a constructive form of the present invention, the carrying means 70 comprises a shaft carrying mechanism 71, which may be displaced through the inside of the hermetic chamber 10 between the primary feeding station 20 and the mounting station 30, said shaft carrying mechanism 71 having a feeding position, which is defined when said shaft is positioned adjacent to a shaft 5 in the primary feeding station 20 ready to be taken to the mounting station 30, as well as a mounting position, which is defined when said shaft carrying mechanism 71 is adjacent to the mounting station 30 carrying a shaft 5 to be released, so as to be mounted to a cylinder block-rotor assembly previously positioned in said mounting station 30.

After grasping a shaft 5 at the primary feeding station 20, the shaft carrying mechanism 71 conducts said shaft 5 to the mounting station 30, aligns the axis of said shaft 5 with the mounting axes of the cylinder block 3 and rotor 7 already positioned at the mounting station 30 and then mounts said refrigerated shaft 5 to the cylinder block-rotor assembly.

In another form of carrying out the present invention, the displacement of each cylinder block 3 and rotor 7, either individually or as an assembly, to be positioned at the mounting station 30, as well as the displacement of the shaft 5 from the primary feeding station 20 to said mounting station 30 are achieved by means of the same carrying means 70 in a synchronized and sequential way in time intervals calculated in function of the time needed for each shaft 5 to stay at the primary feeding station 20, in order that said shaft 5 presents the contraction required to be mounted to a cylinder block-rotor assembly at the mounting station 30.

In a construction of the present invention, after the shaft carrying mechanism 71 has reached its above cited shaft alignment position, said shaft 5, in a refrigerated condition, is submitted to a downward axial displacement towards the cylinder block 3-rotor 7 assembly, until said shaft 5 is seated on said assembly, when the shaft carrying mechanism 71 releases said shaft 5 and returns to its feeding position, restarting the present mounting process for a new shaft 5-rotor 7-cylinder block 3 assembly.

The movement of the shaft carrying mechanism 71 may be defined and controlled by positioning sensors, which determine, for instance, the alignment condition between the axes of the shaft 5 and of the cylinder block-rotor assembly, as well as the position of the shaft carrying mechanism 71 in its feeding position; presence sensors, which determine, e.g., the presence of a shaft 5 ready to be grasped at the primary feeding station 20, as well as of a cylinder block and rotor positioned relative to each other at the mounting station 30; and/or timers, in order to determine, for example, the start of each new operation of the shaft carrying mechanism 71 and feeding the mounting station 30.

In a constructive option, the carrying mechanism 70 further comprises a first grasping element 72, which is provided in the shaft carrying mechanism 71 and which has a retracted position, maintained while the shaft carrying mechanism 71 is being displaced between its feeding and mounting positions, and an extended position, obtained when the shaft carrying mechanism 71 is in its feeding position and, depending upon the equipment, also in its mounting position, when said grasping element 72 is conducted to grasp a shaft 5 at the primary feeding station 20, in order to take said shaft to the mounting station 30, in which the grasping element can be extended again, in order to release the shaft inside the cylinder block-rotor assembly. In this construction, the grasping element 72 of the shaft carrying mechanism 71 is conducted to its retracted position after having grasped a shaft 5 at the primary feeding station 20, said condition being maintained until said shaft carrying mechanism 71 has reached the mounting station 30, when there is a command for the grasping element to move, approximating the cylinder block-rotor assembly to the mounting station 30, until said grasping element 72 has reached its extended position, introducing the shaft 5 into the cylinder block-rotor assembly.

The alignment between the axes of the shaft 5 and of the bearing bore of the cylinder block 3 and central bore of rotor 7 is defined so that the mounting of the shaft 5 to the cylinder block 3 and rotor 7 occurs with no contact between the outer surface of said shaft 5 and the inner surface of the bore of the cylinder block 3 and the central bore of the rotor 7. Moreover, during the relative axial movement between the shaft 5 and cylinder block-rotor assembly, an end of said shaft 5, which is opposed to that where is provided the annular flange 5a and which will later receive and affix the oil centrifuge pump 8, should not oscillate and touch the upper edge of the bearing bore of the cylinder block 3, nor touch the surface of the rotor central bore, since the low temperature of the shaft 5 makes it fragile and susceptible to breaks, mainly due to impact.

The carrying mechanism 70 is further provided with, for example, a rotor carrying mechanism 73, which is provided with a rotor grasping element 74; and a cylinder block carrying means 75, which is provided with a cylinder block grasping element 76.

In another constructive option, the same carrying mechanism of the carrying means 70 provides the conduction of each rotor 7 and cylinder block 3 from the secondary station 40 to the mounting station 30.

In the present construction, the rotor carrying mechanism 73 has a feeding position, which is defined when said mechanism is adjacent to the secondary feeding station 40, ready to grasp a rotor 7, and a mounting position, which is defined when said mechanism is located adjacent to the mounting station 30.

In a similar form, the cylinder block carrying mechanism 75 has a feeding position and a mounting position, which are defined with the positioning of said mechanism adjacent to the secondary feeding station 40 and to the mounting station 30, respectively.

The change between the feeding and mounting positions of each said rotor carrying mechanism 73 and cylinder block mechanism 75 occurs by the translational or rotary displacement of said mechanisms, to be defined during the design of the present device, without altering the intended result.

Each rotor grasping element 74 and cylinder block grasping element 76 has a respective retaining condition and a releasing condition of the respective piece to be transported from the feeding station 40 to the mounting station 30.

After the insertion of each shaft 5 into a rotor-cylinder block assembly by the shaft grasping element 72 of the shaft carrying mechanism has ended, the carrying means 70 commands the removal of the mounted assembly from the inside of the mounting station 30, positioning said assembly inside the hermetic chamber 10, until said assembly reaches a thermal balance between its component parts and is able to be taken out from the hermetic chamber 10. This displacement from the mounting station 30 occurs after a time interval of immobilization of said assembly in said mounting station has elapsed, until the thermal dilatation of the shaft causes the fixation of said shaft to the rotor.

In a constructive variant of the present invention, the carrying means 70 takes each mounted shaft 5-rotor 7-cylinder block 3 assembly to an antichamber, internal to the hermetic chamber and with the same temperature and pressure conditions of the latter, where said temperature balance between said shaft 5 and rotor and cylinder block parts occurs and where said mounted assembly is maintained before being removed from the hermetic chamber 10.

In an embodiment of the present invention, the displacement of each mounted shaft 5-cylinder block 3-rotor 7 assembly from the mounting station to the outside of the hermetic chamber 10 is achieved by one of the mechanism parts of shaft 5, rotor 7 and cylinder block 3, or also by a carrying mechanism of mounted parts, not illustrated, which provides the removal of each said mounted assembly from the inside of the hermetic chamber 10.

I claim:

1. A process for mounting a shaft to a rotor of an electric motor, said shaft having at its upper part an annular flange portion, which is seatable on a bearing portion of a cylinder block, the rotor being attachable around the shaft, in that it comprises the steps of:

a—taking the cylinder block and the rotor from a secondary feeding station to a mounting station provided inside a hermetic chamber having an atmosphere inert at pressures higher than atmospheric pressure, positioning the cylinder block and the rotor relative to each other with a predetermined axial spacing therebetween and with the axes of a bearing bore of the cylinder block and of a central bore of rotor being aligned to each other;

b—taking the shaft, which has been diametrically contracted by refrigeration in a primary feeding station inside the hermetic chamber, to the mounting station and introducing the shaft through both the bearing bore of the cylinder block and the central bore of the rotor, until a mounting position has been achieved in said rotor, without interfering with the walls of said bores;

c—maintaining the shaft cylinder block rotor assembly immobilized in the mounting station, until the diametrical thermal dilatation of the shaft causes said shaft to be secured to the wall of the central bore of rotor; and d—displacing the mounted shaft cylinder block rotor assembly from the mounting station and maintaining said assembly inside the hermetic chamber, until a thermal balance between the parts has been achieved, step "b" occuring within a time interval insufficient for the contracted diameter of the shaft to achieve, by dilatation, a value which is higher than a maximum mounting diameter which is lower than the diameter of the central bore of rotor.

2. Process, according to claim 1, in that step "a" includes an intermediate step of positioning at the mounting station 30 each cylinder block over a rotor.

3. Process, according to claim 2, in that each of the cylinder block and rotor parts is individually conducted to the mounting station.

4. Process, according to claim 3, in that each of the cylinder block and rotor parts is conducted to the mounting station, from a respective feeding station.

5. Process, according to claim 4, in that each cylinder block is conducted to the mounting station after said rotor has been conducted to said station.

6. Process, according to claim 1, in that the cylinder block is positioned at a null axial distance from rotor seated on said cylinder block.

7. Process, according to claim 6, in that step "b" includes the following intermediate steps:

b1—seating a spacing blade on the bearing portion of the cylinder block;

b2—conducting the shaft through the bearing bore of the cylinder block into the central bore of the rotor until, at the mounting position, the annular flange portion of said shaft is seated on the spacing blade;

b3—maintaining the seating condition relative to the bearing portion of the cylinder block while the mounted shaft cylinder block rotor assembly is maintained immobilized at the mounting station; and b4—removing the spacing blade from the seating condition relative to the bearing portion of the cylinder block before removing said shaft-cylinder block-rotor assembly from the mounting station.

8. Process, according to claim 1, in that it includes the intermediate steps of:
   a1—approximating a carrying means to the secondary feeding station, in order to receive and retain a cylinder block rotor assembly in said station, and conducting said assembly to the mounting station, aligning the axes of the bearing bore of the cylinder block and central bore of the rotor;
   a2—approximating the carrying means to a shaft which is provided at the primary feeding station and which is diametrically contracted, in order to retain and conduct said shaft to the mounting station and align the axis of said shaft with the axis of the bore of the cylinder block and the axis of the central bore of the rotor at the mouting station; and
   a3—approximating the carrying means to the mounted shaft- cylinder block- rotor assembly and removing said assembly from the mounting station.

9. Process, according to claim 8, in that the rotor and cylinder block parts are respectively conducted to the mounting station, by a rotor carrying means and a cylinder block carrying means.

* * * * *